United States Patent [19]
Yamanaka et al.

[11] Patent Number: 5,852,108
[45] Date of Patent: Dec. 22, 1998

[54] COMPOSITE PARTICULATE MATERIAL FOR RESIN REINFORCEMENT, PRODUCTION THEREOF, AND REINFORCED RESIN COMPOSITION INCORPORATED THEREWITH

[75] Inventors: Toru Yamanaka; Mitsunari Sotokawa; Shinobu Nakashima, all of Nagoya, Japan

[73] Assignee: Toray Industries, Inc., Japan

[21] Appl. No.: 597,848

[22] Filed: Feb. 7, 1996

[30] Foreign Application Priority Data

May 10, 1995 [JP] Japan .................................. 7-111374

[51] Int. Cl.$^6$ ................ C08J 5/10; C08K 3/34; C08K 9/04; C08L 67/00
[52] U.S. Cl. ............. 524/790; 523/200; 523/212; 523/213; 524/791; 524/786; 524/788; 524/451; 524/425; 524/445; 524/442
[58] Field of Search ................ 524/451, 445, 524/444, 442, 730, 731, 790, 791, 788, 786, 425; 523/200, 212, 213

[56] References Cited

U.S. PATENT DOCUMENTS 5,244,973  9/1993  Sakazume et al. ................ 526/66
5,519,083  5/1996  Ashton et al. ................ 524/493

FOREIGN PATENT DOCUMENTS 50-089493-A  7/1975  Japan .
61-036340-A  2/1986  Japan .
62-096539-A  5/1987  Japan .
63-234043-A  9/1988  Japan .

*Primary Examiner*—James J. Seidleck
*Assistant Examiner*—U. K. Rajguru
*Attorney, Agent, or Firm*—Austin R. Miller

[57] ABSTRACT

A composite particulate material for resin reinforcement which comprises an inorganic particulate material (A) and an elastic polymer (B) having a glass transition temperature of −10° C. or below and also having functional groups capable of forming chemical bonds with resins to be reinforced, said components (A) and (B) accounting for 50–99 wt % and 50–1 wt %, respectively, of their total amount. A process for producing said composite particulate material. A reinforced resin composition incorporated with said composite particulate material. The resin composition yields molded articles which are improved in mutually contradicting properties (that is, impact strength vs. stiffness and elongation at break vs. heat resistance) and which have mechanical properties with less anisotropy. It offers good characteristic properties which are hardly attained by conventional engineering plastic materials.

27 Claims, No Drawings

COMPOSITE PARTICULATE MATERIAL FOR RESIN REINFORCEMENT, PRODUCTION THEREOF, AND REINFORCED RESIN COMPOSITION INCORPORATED THEREWITH

BACKGROUND OF THE INVENTION

There has been an increasing demand for engineering plastics having improved performance, and attempts have been made accordingly to improve the characteristic properties of thermoplastic resin materials. For example, it was reported in Polymer, 26, 1855 (1985) that nylon-66 exhibits a high impact strength when it is incorporated with an elastomer component in finely dispersed form. Moreover, it is known that the incorporation of resin materials with an inorganic filler improves their heat resistance and stiffness. Unfortunately, such modification usually impairs other characteristic properties. For example, incorporation with an elastomer to improve impact strength may impair heat resistance and stiffness; conversely, incorporation with an inorganic filler or reinforcing material to improve heat resistance and stiffness may impair Izod impact strength and puncture impact strength. Thus it is extremely difficult to improve impact strength, heat resistance, and stiffness all at once.

It is also known that it is possible to improve Izod impact strength (with notch) as well as stiffness and heat resistance by incorporation with a fibrous reinforcing material such as glass fiber. However, the improvement achieved in this way is set off by more decrease in puncture impact strength and Izod impact strength (without notch) than in the case where reinforcement is not carried out. Moreover, reinforcement with a fibrous reinforcing material poses problems with decreased elongation, warpage, and anisotropic mechanical properties due to orientation of the fibrous reinforcing material. Such problems are detrimental to engineering materials.

On the other hand, much study has been made to prevent the decrease in impact strength which occurs when a plastic material is incorporated with an inorganic filler which is not in the form of fiber. For example, Japanese Patent Laid-open No. 36340/1986 discloses a process for coating glass beads with a coating agent (such as silane compounds or fluorocarbon compounds) in an amount less than 1 wt %. Coated glass beads are effective in preventing the decrease in impact strength; however, the resulting filled material is inferior in impact strength to unfilled materials. In addition, it turned out that the disclosed procedure does not provide sufficient elongation at break and puncture impact strength.

SUMMARY OF THE INVENTION

It is an object of the present invention to provide a composite particulate material for resin reinforcement, a process for production thereof, and a reinforced resin composition incorporated therewith. According to the present invention, it is possible to obtain a reinforced resin composition which, unlike conventional engineering plastics, is improved in mutually contradictory properties such as impact strength, elongation at break, heat resistance, and stiffness, and which yields molded articles having a minimum of anisotropy in mechanical properties.

The first aspect of the present invention resides in a composite particulate material for resin reinforcement which comprises an inorganic particulate material (A) and an elastic polymer (B) having a glass transition temperature of $-10°$ C. or below and also having functional groups capable of forming chemical bonds with resins to be reinforced, said components (A) and (B) accounting for 50–99 wt % and 50–1 wt %, respectively, of their total amount.

The second aspect of the present invention resides in a process for producing a composite particulate material for resin reinforcement comprising an inorganic particulate material (A) and an elastic polymer (B) having a glass transition temperature of $-10°$ C. or below and also having functional groups capable of forming chemical bonds with resins to be reinforced, said components (A) and (B) accounting for 50–99 wt % and 50–1 wt %, respectively, of their total amount, said process comprising polymerizing a monomer as a raw material of the elastic polymer (B) in the presence of the inorganic particulate material (A).

The third aspect of the present invention resides in a reinforced resin composition which comprises a composite particulate material for resin reinforcement (C) and a thermoplastic resin (D), said composite particulate material (C) which comprises an inorganic particulate material (A) and an elastic polymer (B) having a glass transition temperature of $-10°$ C. or below and also having functional groups capable of forming chemical bonds with resins to be reinforced, said components (A) and (B) accounting for 50–99 wt % and 50–1 wt %, respectively, of their total amount.

DETAILED DESCRIPTION OF THE INVENTION

According to the present invention, component (C) is a composite particulate material for resin reinforcement, which contains an inorganic particulate material (A) as its constituent. Although component (A) is not specifically restricted, it should preferably be one which is selected from the following species.

Silicates such as wollastonite, sericite, kaolin, clay, mica, talc, and montmorillonite.

Metal oxides such as silica, alumina, magnesium oxide, zirconium oxide, and titanium oxide.

Carbonates such as calcium carbonate, magnesium carbonate, and dolomite.

Sulfates such as calcium sulfate, magnesium sulfate, and barium sulfate.

Glass beads, glass flake, boron nitride, silicon carbide, silicon nitride, and potassium titanate. Although these particulate materials may be in hollow form, like glass microballoon, Shirasu balloon, and carbon balloon, they should preferably be in the form of plate and/or granule. Their preferred examples include silica, alumina, glass beads, calcium carbonate, talc, mica, clay, and kaolin.

The inorganic particulate material should have a mean particle diameter of 0.1–10 µm, preferably a mean primary particle diameter of 0.5–2 µm. By the term mean particle diameter is meant the particle diameter measured by the sedimentation method at 50% cumulation.

The inorganic particulate material should preferably be on which is surface-treated with a silane-based or titanate-based coupling agent or any other surface treatment. A preferred coupling agent is a silane compound.

Preferred examples of the silane compound as a coupling agent include the following. γ-glycidoxyropyltrimethoxysilane, γ-glycidoxypropyldiethoxysilane, β-(3,4-epoxycyclohexyl)ethyltrimethoxysilane, γ-anilinopropyltrimethoxysilane, γ-(2-aminoethyl)amino-propyltrimethoxysilane, γ-methacryloxypropyltrimethoxy-silane, and vinyltrimethoxysilane. Of these examples, γ-methacryloxypropyltrimethoxysilane and vinyltrimethoxysilane are preferable.

According to the present invention, component (B) as a constituent of the composite particulate material for resin reinforcement is an elastic polymer having a glass transition temperature of −10° C. or below and also having functional groups capable of forming chemical bonds with resins to be reinforced. The term "chemical bonds" embraces covalent bonds, ionic bonds, and hydrogen bonds, which produce a stronger mutual action than van der Waals' force. If component (B) does not form such chemical bonds with resins to be reinforced, the resulting composite particulate material for resin reinforcement will not readily disperse into the thermoplastic resin uniformly. Even though uniform dispersion is possible, the resulting product will not exhibit the desired mechanical properties.

Thus, by the term "functional groups" is meant those functional groups capable of forming covalent bonds through chemical reactions with the thermoplastic resin (D), capable of forming ionic bonds or hydrogen bonds with the molecules of the thermoplastic resin (D), or capable of strongly acting on the thermoplastic resin (D). Such functional groups include those which are capable of forming chemical bonds with terminal hydroxyl groups, carboxyl groups, and amino groups of the thermoplastic resin; ester linkages, amide linkages, imide linkages, and ether linkages constituting the main chain of the thermoplastic resin; and hydrocarbon groups and aromatic rings. They may be selected from carboxyl group, hydroxyl group, amino group, acid anhydride group, epoxy group, isocyanate group, and ester group.

According to the present invention, the elastic polymer as component (B) should have a glass transition temperature of −10° C. or below so that the resin composition, incorporated with the composite particulate material of the present invention exhibits an improved impact strength. This glass transition temperature is one which is measured by differential scanning calorimetry, with temperature raised at a rate of 10° C./min.

A preferred example of the elastic polymer as component (B) for the composite particulate material in the present invention is one which has a 100% modulus (at 23° C.) lower than 100 MPa, preferably lower than 50 MPa. Incidentally, in the case where the composite particulate material of the present invention is produced by polymerization in the presence of the inorganic particulate material as component (A), it is impossible to evaluate the mechanical properties of the elastic polymer as component (B) in free form. In such a case, necessary measurements are carried out on a sample obtained by polymerization (under the same conditions) in the absence of the inorganic particulate material (A).

The elastic polymer as component (B) should preferably be one which is composed of two kinds of structural units, one unit (b1) and the other unit (b2). The unit (b1) is formed from at least one species of monomer having in its molecule at least one carbon-carbon double bond and at least one functional group capable of forming chemical bonds with resins to be reinforced. The unit (b2) is formed from a monomer capable of forming the structural unit through copolymerization with monomer forming the unit (b1). The amount of monomers forming the units (b1) and (b2) should preferably be 0.1–50 wt %, more preferably 1–20 wt %, and 99.9–50 wt %, more preferably 99–80 wt %, respectively, of the amount of the elastic polymer as component (B).

Monomer forming the unit (b1) may have, in addition to the carbon-carbon double bond, functional groups which form covalent bonds through chemical reaction with the thermoplastic resin to be reinforced or which form ionic bonds or hydrogen bonds (for strong mutual action) with the molecules of the thermoplastic resin. Such functional groups include those which are capable of forming chemical bonds with terminal hydroxyl groups, carboxyl groups, and amino groups of the thermoplastic resin; ester linkages, amide linkages, imide linkages, and ether linkages constituting the main chain of the thermoplastic resin; and hydrocarbon groups and aromatic rings. They may be selected from carboxyl group, hydroxyl group, amino group, acid anhydride group, epoxy group, isocyanate group, and ester group. These functional groups may need a catalyst for their reaction.

Consequently, it is desirable that the elastic polymer as component (B) be one which is capable of reacting directly with the thermoplastic resin as component (D) to be reinforced. The term "directly" means that reaction takes place in the absence of a layer of a polymer (e.g., the one having a Tg higher than −10° C.) between component (B) and component (D).

Preferred examples of the monomer forming the unit (b1) include unsaturated carboxylic acids and derivatives thereof which contain one or more carbon-carbon double bonds in the molecule. Such unsaturated carboxylic acids are exemplified by acrylic acid, methacrylic acid, ethacrylic acid, crotonic acid, maleic acid, fumaric acid, itaconic acid, citraconic acid, butenedicarboxylic acid, and tetrahydrophthalic acid. Their derivatives are exemplified by aryl esters, glycidyl esters, acid anhydrides, and imides. The category of the monomer forming the unit (b1) excludes alkyl esters having no functional groups of unsaturated carboxylic acid, because they do not react with ordinary thermoplastic resins. In addition, the category of the monomer forming the unit (b1) excludes those monomers which have one or more carbon-carbon double bonds and di- or tri-alkoxysilyl groups in the molecule, because they react preferentially with ordinary inorganic fillers. Preferred examples of monomer forming the unit (b1) include acid anhydrides(such as maleic anhydride, itaconic anhydride, and tetrahydrophthalic anhydride) and glycidyl esters (such as glycidyl methacrylate).

Another monomer forming the unit (b2) constituting the elastic polymer(B) is one which is capable of copolymerization with the above-mentioned monomer forming the unit (b1). It is not specifically restricted; however, it should be selected such that the elastic polymer (B) composed of the monomer units (b1) and(b2) has a glass transition temperature of −10° C. or below.

Preferred examples of the structural unit (b2) include those which are formed from one or more members selected from ethylene, α-olefins (having 3 or more carbon atoms), non-conjugated diene, vinyl acetate, vinyl alcohol, alkyl esters of α, β-unsaturated carboxylic acid, conjugated diene monomer, and aromatic vinyl hydrocarbon monomer.

Examples of the α-olefin having 3 or more carbon atoms include propylene, butene-1, pentene-1, 3-methyl-pentene-1, and octadecene-1. Of these, propylene and butene-1 are preferable.

Examples of the non-conjugated diene include norbornenes(such as 5-methylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene, and 5-methyl-5-vinyl-norbornene), dicyclopentadiene, methyl tetrahydroindene, 4,7,8,9-tetrahydroindene, 1,5-cyclooctadiene, 1,4-hexadiene, isoprene, 6-methyl-1,5- heptadiene, and 11-ethyl-1,11-tridecadiene. Preferable among these examples are 5-methylidene-2-norbornene, 5-ethylidene-2-norbornene, dicyclopentadiene, and 1,4-hexadiene.

Examples of the alkyl ester of $\alpha, \beta$-unsaturated carboxylic acid include alkyl esters of acrylic acid, methacrylic acid, ethacrylic acid, crotonic acid, maleic acid, fumaric acid, itaconic acid, citraconic acid, and butenedicarboxylic acid.

Examples of the conjugated diene monomer include 1,3-butadiene, isoprene (2-methyl-1,3-butadiene), 2,3-dimethyl-1,3-butadiene, and 1,3-pentadiene.

Examples of the aromatic vinyl hydrocarbon monomer include styrene, $\alpha$-methylstyrene, o-methylstyrene, p-methylstyrene, 1,3-dimethylstyrene, and vinylnaphthalene. Of these, styrene is preferable.

What is important to note in selecting the structural unit (b2) of the elastic polymer (B) from the above-mentioned examples is that the resulting elastic polymer (B) has a glass transition temperature of $-10°$ C. or below.

Preferred examples of a monomer forming the unit (b2) constituting the elastic polymer (B) include alkyl esters of acrylic acid and/or methacrylic acid, such as methyl acrylate, ethyl acrylate, n-propyl acrylate, isopropyl acrylate, n-butyl acrylate, t-butyl acrylate, n-hexyl acrylate, 2-ethylhexyl acrylate, n-decyl methacrylate, n-propyl methacrylate, isopropyl methacrylate, n-butyl methacrylate, t-butyl methacrylate, n-hexyl methacrylate, n-decylmethacrylate, and lauryl methacrylate. They may be used alone or in combination with one another. Preferable among these examples are n-propyl acrylate, n-butyl acrylate, n-propyl methacrylate, n-butyl methacrylate, n-hexyl acrylate, and n-hexyl methacrylate. Of these, n-butyl acrylate is particularly preferable.

The above-mentioned units (b1) and (b2) should preferably be used in such a ratio that the structural unit (b1) accounts for 0.1–50 wt %, more preferably 1–20 wt %, in the elastic polymer (B) and the structural unit (b2) accounts for 99.9–50 wt %, more preferably 99–80 wt % in the elastic polymer (B). In addition, the structural units and their ratio should be selected so that the resulting elastic polymer (B) has a glass transition temperature of $-10°$ C. or below.

The structural unit (b-2) in the present invention may be composed mainly of two kinds of structural units. The first one is derived from at least one monomer selected from ethylene, $\alpha$-olefins having 3 or more carbon atoms, non-conjugated diene, vinyl acetate, vinyl alcohol, alkyl ester of $\alpha, \beta$-unsaturated carboxylic acid, conjugated diene monomer, and aromatic vinyl hydrocarbon monomer. The second one is a unit formed from a monomer having in the molecule at least one carbon-carbon double bond and di- or tri-alkoxysilyl groups. The second one should be used optionally in an amount of 0–20 wt % in the elastic polymer (B). Examples of the optional unit include $\gamma$-methacryloxypropyltrimethoxysilane and vinyl trimethoxysilane.

As mentioned above, the composite particulate material of the present invention is composed of (A) an inorganic particulate material and (B) an elastic polymer having a glass transition temperature of $-10°$ C. or below and functional groups capable of forming chemical bonds with resins to be reinforced. It is important that these components (A) and (B) be "composited" with each other such that they have a mutually bonded interface. Their "compositting" should preferably be such that component (A) is coated with component (B). Complete bonding at the interface between them provides both high stiffness and high impact strength.

The maximum bond strength between the inorganic particulate material (A) and the elastic polymer (B) can be achieved by means of covalent bonds between them. There are several methods for this end.

Direct reaction between (A) and (B) through the former's surface functional groups.

Polymerization of a monomer capable of reaction with the surface functional groups of (A). The resulting product is the composite particulate material of the present invention.

Introduction of functional groups onto the surface of (A) and subsequent reaction of (A) with (B).

Polymerization of a monomer capable of reaction with functional groups (introduced by use of a coupling agent). The resulting product is the composite particulate material of the present invention. A coupling agent is an effective means to increase bond strength; and this is the case when the inorganic particulate material (A) is previously treated with any of the above listed silane coupling agents. Preferable among them are $\gamma$-methacryloxypropyltrimethoxysilane, $\gamma$-glycidoxypropylmethyldiethoxysilane, vinyltrimethoxysilane, and $\gamma$-glycidoxypropyltrimethoxysilane.

One way of evaluating the bond strength is to measure the amount of the elastic polymer (B) that is extracted from the composite particulate material using an adequate solvent under adequate conditions. A satisfactory bond strength is suggested if more than 60 wt % (preferably 70 wt %) of the elastic polymer (B) remains unextracted. Extraction may be accomplished by using a Soxhlet apparatus and a solvent which gives the solubility of more than 1 g of the elastic polymer for 100 g of solvent at the extraction temperature.

The ratio of the inorganic particulate material (A) to the elastic polymer (B) in their total amount should be 50–99 wt % to 50–1 wt %, preferably 70–99 wt % to 30–1 wt %.

There are no specific restrictions on the process of producing the composite particulate material for resin reinforcement. One example of the process is coating the surface of the inorganic particulate material (A) with the elastic polymer (B) in molten state. Another example is coating the inorganic particulate material (A) with a solution of the elastic polymer (B) in an solvent. Further another process, which is desirable for bond strength and coating structure, is polymerizing a monomer for the elastic polymer (B) in the presence of the inorganic particulate material (A) which has or has not been treated with a coupling agent. If the inorganic particulate material(A) is in the form of fine particles, it is desirable to carry out the polymerization in a dispersing medium (preferably water) in which such fine particles are uniformly dispersed. Especially emulsion polymerization is preferable. Emulsion polymerization mentioned is performed on a monomer for the elastic polymer (B) in an emulsifiable aqueous medium containing the inorganic particulate material(A).

The inorganic particulate material (A) may have either a hydrophilic surface or a hydrophobic surface depending on its characteristic properties and surface treatment. In the latter case it is advisable to use an emulsifier for stable emulsification and dispersion in an aqueous medium. The most preferable among the processes for producing the composite particulate material for resin reinforcement is emulsion polymerization that is performed on a monomer for the elastic polymer (B) in an emulsifiable aqueous medium containing the inorganic particulate material (A) which has been treated with a coupling agent.

The emulsifier for this purpose may be selected from nonionic, anionic, or cationic surface active agents which are commonly used for emulsion polymerization of vinyl monomer. The first two kinds are preferable. They may be used in combination.

Preferred examples of the nonionic surface active agents include polyoxyethylene alkyl ether, polyoxyethylene alkylphenol ether, polyoxyethylene mono-fatty acid ester, polyoxyethylene di-fatty acid ester, monopolyoxyethylene ester of phosphoric acid, and dipolyoxyethylene ester of phosphoric acid. Preferred examples of the anionic surface active agents include sodium alkyl sulfate (such as sodium lauryl sulfate), sodium polyoxyethylene alkyl sulfate (such as sodium polyoxyethylene laurylether sulfate), fatty acid soap, olefin sulfonate, and alkylaryl sulfonate. Of these examples, nonionic surfactants of phosphate ester type (represented by the formula below) and metal salts (formed by neutralizing the phosphoric acid group with an alkali) and anionic surfactants of sodium alkyl sulfate and metal salts of fatty acid are particularly desirable.

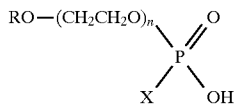

R=aliphatic group

If emulsion polymerization is employed to produce the composite particulate material for resin reinforcement according to the present invention, it is desirable to uniformly disperse the inorganic particulate material (A) into water beforehand with the aid of a surface active agent. Dispersion should preferably be accomplished by using any known homogenizer. Before emulsion polymerization, the emulsified dispersion of the inorganic particulate material (A) should be kept stable by adjusting the system to pH 4–11, preferably pH 5–10, most desirably pH 6–10, at 23° C. Extreme basicity or acidity should be avoided.

In carrying out the emulsion polymerization mentioned above, a radical initiator may be added the polymerization system. If the monomer for the elastic polymer (B) is one or more species selected from (meth) acrylate esters and unsaturated carboxylic acids (and derivatives thereof) having at least one carbon-carbon double bond in the molecule, a known radical initiator(preferably a water-soluble one) is desirably added to the polymerization system. The type of the radical initiator to be selected depends on the kind of the surface active agent. Preferred examples of the radical initiator are persulfates (of sodium, potassium, and ammonium) and organic peroxides, if the polymerization system consists of water as a medium and a nonionic or anionic surface active agent as an emulsifier.

The above-mentioned emulsion polymerization gives rise to an emulsion, which, upon coagulation in the usual way (or the addition of sulfuric acid or electrolyte), yields the composite particulate material (C). The resulting coagulum may be recovered as such for easy handling. The thus obtained composite particulate material (C) may be incorporated into the thermoplastic resin (D) after drying or in a wet state. Even when used in the form of coagulum, the composite particulate material (C) will be dispersed uniformly into the thermoplastic resin (D) during the subsequent mixing step on account of good compatibility and reactivity between them.

Upon dispersion into the thermoplastic resin (D), the composite particulate material (C) greatly improves the mechanical and thermal properties of the former.

In production of the resin composition, the amount of the composite particulate material (C) to be incorporated (by dispersion) into the thermoplastic resin (D) should be 1–70 wt %, preferably 10–50 wt %, of their total amount.

The thermoplastic resin (D) used for production of the resin composition should preferably be one which has a melting point higher than 150° C. (if it has a melting point) or a glass transition temperature higher than 100° C. (if it has no melting point). In addition, it should preferably be one which has a flexural modulus higher than 1.5 GPa (preferably higher than 2.0 GPa) measured at 23° C. according to ASTM D790.

Typical examples of the thermoplastic resin (D) include polyacetal resin, polycarbonate resin, modified polyphenyleneether resin, polyester resin, polyamide resin, polyarylenesulfide resin, fluoropolymer, polysulfone resin, polyethersulfone resin, polyether ether ketone resin, and polyetherimide resin. Of these examples, polyester resin, polyamide resin, and polyarylene sulfide resin are particularly preferable. They may be used alone or in combination with one another.

The thermoplastic resin to be used in the present invention will be explained below in more detail.

The term "polyester resin" denotes any thermoplastic polyester which incledes chain segments having aromatic rings. Usually, it is a homopolymer or copolymer which is obtained by condensation reaction mainly from an aromatic dicarboxylic acid (or an ester-forming derivative thereof) and a diol (or an ester-forming derivative thereof) and/or a hydroxycarboxylic acid. In addition, it may or may not be of liquid-crystal type.

Examples of the aromatic dicarboxylic acid include terephthalic acid, isophthalic acid, orthophthalic acid, 1,5-naphthalenedicarboxylic acid, 2,6-naphthalenedicarboxylic acid, 4,4'-diphenyldicarboxylic acid, 3,3'-diphenyldicarboxylic acid, 4,4'-diphenyletherdicarboxylic acid, 4,4'-diphenylmethanedicarboxylic acid, 4,4'-diphenylsulfonedicarboxylic acid, 4,4'-diphenylisopropylidenedicarboxylic acid, 1,2-bis(phenoxy)ethane-4,4'-dicarboxylic acid, 2,5-anthracenedicarboxylic acid, 4,4"-p-terphenylene-dicarboxylic acid, and 2,5-pyridinedicarboxylic acid. Of these examples, terephthalic acid is preferable. They may be used in combination with one another or with a small amount (less than 20 mol %) of aliphatic dicarboxylic acid (such as adipic acid, azelaic acid, sebacic acid, and dodecanedioic acid) or alicyclic dicarboxylic acid (such as cyclohexanedicarboxylic acid).

Examples of the diol include aliphatic diols (such as ethylene glycol, propylene glycol, 1,4-butanediol, neopentyl glycol, 1,5-pentanediol, 1,6-hexanediol, 2-methyl-1,3-propanediol, diethylene glycol, triethylene glycol, and decamethylene glycol); alicyclic diols (such as 1,4-cyclohexanedimethanol); aromatic diols (such as bis-phenol A, bisphenol S, bisphenol F, 4,4'-dihydroxybiphenyl, 4,4'-dihydroxydiphenylether, hydroquinone, 2,6-dihydroxynaphthalene, and 2,7-dihydroxynaphthalene); and a mixture thereof. They may be copolymerized with one or more species of long chain diols (having a molecular weight of 400 to 6000), such as polyethylene glycol, poly-1,3-propylene glycol, and polytetramethylene glycol, in a small amount.

Examples of the hydroxycarboxylic acid include p-hydroxybenzoic acid, m-hydroxybenzoic acid, 6-hydroxy-2-naphthoic acid, and 4'-hydroxy-biphenyl-4-carboxylic acid.

Examples of the polyester resin include polyethyleneterephthalate, polypropylene terephthalate, polybutyleneterephthalate, polyhexyleneterephthalate, polyethylene-2,6-naphthalenedicarboxylate, polybutylene-2,6-naphthalenedicarboxylate, polyethylene-1,2-bis (phenoxy)ethane-4,4'-dicarboxylate, and copolymer of polyesters (such as polyethyleneisophthalate/terephthalate, polybutylene isophthalate/terephthalate, polybutylene isophthalate/terephthalate, polybutylene terephthalate/decanedicarboxylate, polyethylene-4,4'-dicarboxylate/terephthalate, p-oxybenzoic acid/polyethylene terephthalate, and p-oxybenzoic acid/6-oxy-2-naphthoic acid. Of these examples, polybutyleneterephthalate, polyethylene terephthalate, polyethylene-2,6-naphthalenedicarboxylate, and polybuthylene-2,6-naphthalenedicarboxylate are preferable on account of their balanced mechanical properties and moldability.

The polybutylene terephthalate should preferably be one which has an intrinsic viscosity of 0.8–1.9, especially 1.0–1.5, measured at 25° C. in 0.5 wt % solution in o-chlorophenol. The polyethylene terephthalate should preferably be one which has an intrinsic viscosity of 0.36–1.60, especially 0.52–1.35, measured under the same condition as above.

Examples of the polyamide resin include ring-opening polymerizate of cyclic lactam, polycondensate of aminocarboxylic acid, and polycondensate of dicarboxylic acid and diamine. Their specific examples are aliphatic polyamides (such as nylon-6, nylon-4,6, nylon-6,6, nylon-6,10, nylon-6,12, nylon-11, and nylon-12), aliphatic-aromatic polyamides (such as poly(m-xylyleneadipamide), poly(hexamethyleneterephthalamide), poly(hexamethyleneisophthalamide), and poly(tetramethyleneisophthalamide)), and copolymers and mixtures thereof. Of these polyamide resins, nylon-6 and nylon-6,6 are preferable.

The polyarylene sulfide resins may be either of crosslinked type or linear type. A preferred example is polyphenylene sulfide.

The composite particulate material (C) to be dispersed into the thermoplastic resin (D) should be constructed such that the inorganic particulate material (A) and the elastic polymer (B) have a mutual interface for their bonding. In other words, more than 50% (preferably more than 80%) of the elastic polymer (B) should be in contact with the inorganic particulate material (A).

The presence of such an interface can be confirmed by observing an extremely thin section of the resin composition by using a transmission electron microscope (TEM). This observation is carried such that there are at least ten particles (A) in the field, and the area of the elastic polymer (B) in contact with the particles (A) is compared with the total area of the elastic polymer (B).

One feature of the resin composition of the present invention resides in yielding molded articles having both high impact strength and high stiffness. For the resin composition to produce its desired effects, it is necessary that its characteristic properties satisfy the following inequalities.

$$Mc > M0 \quad \text{(Formula 1)}$$

$$Mc < 0.07 * Sc - 1.6 \quad \text{(Formula 2)}$$

where Sc is the notched Izod impact strength (⅛" thick, in J/m) measured according to ASTM D256, Mc is the flexural modulus (in GPa) measured according to ASTM D790, and M0 is the flexural modulus (in GPa) of the injection molded specimen of the thermoplastic resin (D) measured according to ASTM D790. All measurements are carried out at 23° C.

The reinforced resin composition pertaining to the present invention should have a puncture impact strength(total breaking energy) which should preferably be more than 200% that of the resin composition which is composed only of the inorganic particulate material (A) and the thermoplastic resin (D) (or in which the elastic polymer (B) is replaced by the same amount of the thermoplastic resin (D)). The puncture impact strength is measured according to ASTM D3763, except that a 2-mm thick specimen is used.

One feature of the present invention is that it is possible to improve the thermoplastic resin (D) in impact strength by incorporation with the above-mentioned composite particulate material (C) for reinforcement. The notched Izod impact strength of the resin composition of the present invention should preferably have relations with the content of the inorganic particulate material (A) shown in the following inequalities.

|  |  |  |
|---|---|---|
|  | Sc > 1.65*XA + S0 | (Formula 3) |
| preferably | Sc > 1.65*XA + 1.2*S0 | (Formula 4) |
| more preferably | Sc > 1.65*XA + 1.5*S0 | (Formula 5) | where XA is the amount (in wt %) of the inorganic particulate material (A) added, Sc is the notched Izod impact strength(⅛" thick, in J/m) of the injection-molded specimen, and S0 is the notched Izod impact strength (⅛" thick, in J/m) of the specimen of the thermoplastic resin (D) alone. Measurements of the notched Izod impact strength are carried out at 23° C. according to ASTM D256.

It is believed that the elastic polymer (B) contained in the composite particulate material (C) is responsible for the improved impact strength. The effect for the improvement of the impact strength is higher than that of the ordinary high-impact plastic obtained by polymer blending. The notched Izod impact strength of the resin composition of the present invention should preferably have relations with the content of the elastic polymer(B) shown in the following inequalities.

|  |  |  |
|---|---|---|
|  | Sc > 1.86*XB + 1.3*S0 | (Formula 6) |
| preferably | Sc > 4.5*XB + 1.3*S0 | (Formula 7) |
| more preferably | Sc > 4.5*XB + 1.8*S0 | (Formula 8) |
| most desirably | Sc > 4.5*XB + 2.2*S0 | (Formula 9) | where XB is the amount (in wt %) of the elastic polymer (B),Sc is the notched Izod impact strength (⅛" thick, in J/m)of the injection-molded specimen, and S0 is the notched Izod impact strength (⅛" thick, in J/m) of the specimen of the thermoplastic resin (D) alone. Measurements of the notched Izod impact strength are carried out at 23° C. according to ASTM D256.

There are no specific restrictions on the process of producing the resin composition according to the present invention. A preferred process consists of melt-mixing the thermoplastic resin (D) with the composite particulate material (C) which has previously been prepared. The melt mixing may be accomplished by using any known mixing machine such as single- or twin-screw extruder, Banbury mixer, kneader, and mixing roll.

Incidentally, the resin composition of the present invention will increase in stiffness with a minimum loss in toughness if it is incorporated with 1–70 parts by weight of fibrous reinforcing agent for 100 parts of the resin composition by weight.

Furthermore, the plastic composition of the present invention will have good ductility if it is incorporated, during the melt mixing, with a compound (E) which has functional groups capable of forming chemical bonds with the thermoplastic resin (D). Such a compound (E) is exemplified by the component (b1) constituting the elastic polymer (B). The component (b1) is a monomer which has at least one carbon-carbon double bond in the molecule and is capable of forming chemical bonds with the resin for reinforcement. Preferred examples include acid anhydrides (such as maleic anhydride, itaconic anhydride, and tetrahydrophthalic anhydride) and glycidyl esters (such as glycidylmethacrylate).

The compound (E) should preferably be used in an amount of 0.1–10 parts by weight, more preferably 0.5–5 parts by weight, for 100 parts of the composite particulate material(C) by weight.

The compound (E) should preferably be used in combination with a radical initiator (F), especially in the form of organic peroxide. Preferred examples of the compound(F) include 2,5-dimethyl-2,5-di(t-butylperoxy)hexane, t-butylcumylperoxide, di-isopropylbenzenehydroperoxide, di-t-butylperoxide, 2,5-dimethyl-2,5-di(t-butylperoxy) hexane-3, cumenehydroperoxide, and t-butylhydroperoxide. Their selection depends on the condition of melt-mixing.

The radical initiator (F) above-mentioned should preferably be used in an amount of 0.01–1 parts by weight, preferably 0.05–0.5 parts by weight, for 100 parts of the composite particulate material(C) by weight.

The resin composition of the present invention may be incorporated with at least one kind of commonly used additives, such as antioxidant, heat stabilizer, UV light absorber, flame retardant, lubricant, mold release, coloring agent (dye and pigment), and nucleating agent, in an amount not harmful to the effect of the present invention.

The reinforced resin composition of the present invention can be easily molded in the usual way, such as injection molding. The resulting molded articles have good impact resistance, heat resistance, and stiffness. In addition, they have a good external appearance with a minimum of warpage and anisotropy. Therefore, they are suitable for use as engineering parts and structural materials of various kinds.

EXAMPLES

The invention will be described in more detail with reference to the following examples.

Example 1

(Preparation of the composite particulate material for plastic reinforcement)

1 kg of talc having an average particle diameter of 1.4 $\mu$m(LMS300 from Fuji Talc Industry Co., Ltd.) was uniformly sprayed with 100 g of methanol solution containing 14.25 g of γ-methacryloxypropyltrimethoxysilane (SZ-6030 from Dow Corning Toray Silicone Co., Ltd.) and 0.75 g of DBU (1,8-diaza-bicyclo-[5.4.0]-7-undecene) as a catalyst. The talc was stirred by using a Henschel mixer for 30 minutes and the resulting mixture was heat-treated at 130° C. for 12 hours. Thus there was obtained surface-treated talc (A-1).

240 g of the surface-treated talc (A-1) was dispersed into 900 g of pure water (deionized water) containing 30 g of 10 wt % aqueous solution of nonionic surface active agent ("Phosphanol RS-610" from Toho Chemical Industry Co., Ltd.) having the structural formula below, by using a mechanical homogenizer ("Ultra-Turrax T-50" from JANKE & KUNKEL GMBH & Co.KG) for 5 minutes at 6000 rpm and for additional 5 minutes at 10,000 rpm. There was obtained a low-viscosity uniform emulsified dispersion having pH 6.39 at 23° C.

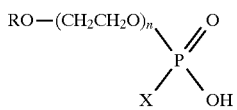

X=—OH, —(CH$_2$CH$_2$)$_n$—OR
R=aliphatic group

This emulsified dispersion was placed in a polymerization reactor equipped with a stirrer and a dropping feeder. The reactor was charged with a monomer mixture and a polymerization initiator over about 2 hours, with the temperature kept at 70° C. and the contents stirred at about 300 rpm. The monomer mixture was composed of 54 g of butyl acrylate and 6 g of maleic anhydride dissolved in the former. The initiator was 15 g of 10 wt % aqueous solution of potassium persulfate. After charging, stirring was continued for about 1 hour at 70° C.

The resulting reaction product was poured into 2000 g of 0.75 wt % aqueous solution of aluminum sulfate which was stirred continuously, so as to bring about coagulation. The coagulum was filtered out and washed repeatedly and finally vacuum-dried at 70° C. for 12 hours. Thus there was obtained the composite particulate material (C-1) for resin reinforcement.

The composite particulate material was found by thermogravimetry to contain 16.5% of elastic polymer in solids. This content suggests that the degree of conversion for the elastic polymer (B) was about 79%. After extraction with toluene for 10 hours by means of a Soxhlet apparatus, the sample underwent thermogravimetry again. It was found that about 75% of the elastic polymer remained on the inorganic particles without being extracted.

Example 2

The same procedure as in Example 1 was repeated to produce the composite particulate material (C-2) for resin reinforcement, except that the monomer mixture for the elastic polymer (B) was replaced by the one which consists of 48 g of butyl acrylate and 12 g of maleic anhydride.

The composite particulate material was found by thermogravimetry to contain 16.6% of elastic polymer in solids. This content suggests that the degree of conversion for the elastic polymer (B) was about 80%. After extraction with toluene for 10 hours by means of a Soxhlet apparatus, the sample underwent thermogravimetry again. It was found that about 73% of the elastic polymer remained on the inorganic particles without being extracted.

Example 3

The same procedure as in Example 1 was repeated to produce the composite particulate material (C-3) for resin reinforcement, except that the nonionic surface active agent was replaced by 36 g of 10 wt % aqueous solution of sodium lauryl sulfate (an anionic surface active agent, "Emal 10" from Kao Corp.). The emulsified dispersion before emulsion polymerization had pH 9.48 at 23° C.

The composite particulate material was found by thermogravimetry to contain 16.9% of elastic polymer in solids. This content suggests that the degree of conversion for the elastic polymer (B) was about 85%. After extraction with toluene for 10 hours by means of a Soxhlet apparatus, the sample underwent thermogravimetry again. It was found that about 86% of the elastic polymer remained on the inorganic particles without being extracted.

Example 4

1 kg of synthetic silica in the form of spherical particles having an average particle diameter of 0.8 $\mu$m ("Adomafine SO-25R" from Tatsumori Ltd.) was uniformly sprayed with 100 g of methanol solution containing 14.25 g of γ-methacryloxypropyltrimethoxysilane and 0.75 g of DBU (1,8-diazabicyclo-[5.4.0]-7-undecene) as a catalyst. The silica was stirred by using a Henschel mixer for 30 minutes and the resulting mixture was heat-treated at 130° C. for 12 hours. Thus there was obtained surface-treated silica (A-2).

240 g of the surface-treated silica (A-2) was dispersed into 900 g of pure water (deionized water) containing 9 g of 10 wt % aqueous solution of sodium lauryl sulfate (anionic surface active agent, "Emal 10" from Kao Corp.), the same one as used in Example 3, by using a mechanical homogenizer("Ultra-Turrax T-50" from JANKE & KUNKEL GMBH & Co. KG) for 5 minutes at 6000 rpm and for additional 5 minutes at 10,000 rpm. There was obtained a low-viscosity uniform emulsified dispersion having pH 7.19 at 23° C.

This emulsified dispersion was placed in a polymerization reactor equipped with a stirrer and a dropping feeder. The reactor was charged with a monomer mixture and a polymerization initiator over about 2 hours, with the temperature kept at 70° C. and the contents stirred at about 300 rpm. The monomer mixture was composed of 54 g of butyl acrylate and 6 g of maleic anhydride dissolved in the former. The initiator was 15 g of 10 wt % aqueous solution of potassium persulfate. After charging, stirring was continued for about 1 hour at 70° C.

The resulting reaction product was poured into 2000 g of 0.75 wt % aqueous solution of aluminum sulfate which was stirred continuously, so as to bring about coagulation. The coagulum was filtered out and washed repeatedly and finally vacuum-dried at 70° C. for 12 hours. Thus there was obtained the composite particulate material (C-4) for resin reinforcement.

The composite particulate material was found by thermogravimetry to contain 19.6% of elastic polymer in solids. This content suggests that the degree of conversion for the elastic polymer (B) was about 98%. After extraction with toluene for 10 hours by means of a Soxhlet apparatus, the sample underwent thermogravimetry again. It was found that about 85% of the elastic polymer remained on the inorganic particles without being extracted.

Example 5

1 kg of calcined kaolin having an average particle diameter of 0.8 μm ("Satintone 5" from Engelhard Corp.) was uniformly sprayed with 100 g of methanol solution containing 14.25 g of γ-methacryloxypropyltrimethoxysilane and 0.75 g of DBU (1,8-diazabicyclo-[5.4.0]-7-undecene) as a catalyst. The kaolin was stirred by using a Henschel mixer for 30 minutes and the resulting mixture was heat-treated at 130° C. for 12 hours. Thus there was obtained surface-treated kaolin (A-3).

240 g of the surface-treated kaolin (A-3) was dispersed into 900 g of pure water (deionized water) containing 39 g of 10 wt % aqueous solution of sodium lauryl sulfate (anionic surface active agent, "Emal 10" from Kao Corp.), the same one as used in Example 3, by using a mechanical homogenizer ("Ultra-Turrax T-50" from JANKE & KUNKEL GMBH & Co. KG) for 5 minutes at 6000 rpm and for aditional 5 minutes at 10,000 rpm. There was obtained a low-viscosity uniform emulsified dispersion having pH 5.29 at 23° C.

This emulsified dispersion was placed in a polymerization reactor equipped with a stirrer and a dropping feeder. The reactor was charged with a monomer mixture and a polymerization initiator over about 2 hours, with the temperature kept at 70° C. and the contents stirred at about 300 rpm. The monomer mixture was composed of 54 g of butyl acrylate and 6 g of maleic anhydride dissolved in the former. The initiator was 15 g of 10 wt % aqueous solution of potassium persulfate. After charging, stirring was continued for about 1 hour at 70° C.

The resulting reaction product was poured into 2000 g of 0.75 wt % aqueous solution of aluminum sulfate which was stirred continuously, so as to bring about coagulation. The coagulum was filtered out and washed repeatedly and finally vacuum-dried at 70° C. for 12 hours. Thus there was obtained the composite particulate material (C-5) for resin reinforcement.

The composite particulate material was found by thermogravimetry to contain 16.4% of elastic polymer in solids. This content suggests that the degree of conversion for the elastic polymer (B) was about 82%. After extraction with toluene for 10 hours by means of a Soxhlet apparatus, the sample underwent thermogravimetry again. It was found that about 88% of the elastic polymer remained on the inorganic particles without being extracted.

Example 6

240 g of talc (A-4) having an average particle diameter of 1.4 μm("LMS300", without surface treatment, from Fuji Talc Industry Co., Ltd.), the same one as used in Example 1, was dispersed into 900 g of pure water (deionized water) by using a mechanical homogenizer ("Ultra-Turrax T-50" from JANKE & KUNKEL GMBH & Co. KG). There was obtained a low-viscosity uniform emulsified dispersion having pH 8.99 at 23° C.

The emulsified dispersion was placed in a polymerization reactor. The reactor was charged with a monomer mixture and a polymerization initiator over about 2 hours, with the temperature kept at 70° C. and the contents stirred at about 300 rpm. The monomer mixture was composed of 54 g of butyl acrylate and 6 g of maleic anhydride dissolved in the former. The monomer mixture contains 4 g of γ-methacryloypropyltrimethoxysilane dissolved therein. The initiator was 15 g of 10 wt % aqueous solution of potassium persulfate. After charging, stirring was continued for about 2 hours at 70° C.

The resulting reaction product was poured into 2000 g of 0.75 wt % aqueous solution of aluminum sulfate which was stirred continuously, so as to bring about coagulation. The coagulum was filtered out and washed repeatedly and finally vacuum-dried at 70° C. for 12 hours. Thus there was obtained the composite particulate material (C-6) for resin reinforcement.

The composite particulate material was found by thermogravimetry to contain 14.5% of elastic polymer in solids. This content suggests that the degree of conversion for the elastic polymer (B) was about 73%. After extraction with toluene for 10 hours by means of a Soxhlet apparatus, the sample underwent thermogravimetry again. It was found that about 65% of the elastic polymer remained on the inorganic particles without being extracted.

Example 7

The same procedure as in Example 3 was repeated to produce the composite particulate material (C-7) for resin reinforcement, except that the γ-methacryloxypropyltrimethoxysilane (as a coupling agent) was replaced by 14.25 g of vinyltrimethoxysilane ("SZ- 6300", from Dow Corning Toray Silicone Co., Ltd.). The emulsified dispersion before emulsion polymerization had pH 9.52 at 23° C.

The composite particulate material was found by thermogravimetry to contain 15.3% of elastic polymer in solids. This content suggests that the degree of conversion for the elastic polymer (B) was about 77%. After extraction with toluene for 10 hours by means of a Soxhlet apparatus, the sample underwent thermogravimetry again. It was found that about 81% of the elastic polymer remained on the inorganic particles without being extracted.

Example 8

The same procedure as in Example 7 was repeated to produce the composite particulate material (C-8) for resin reinforcement, except that the talc was replaced by the calcined kaolin (used in Example 5). The emulsified dispersion before emulsion polymerization had pH 5.61 at 23° C.

The composite particulate material was found by thermogravimetry to contain 16.4% of elastic polymer in solids. This content suggests that the degree of conversion for the elastic polymer (B) was about 84%. After extraction with toluene for 10 hours by means of a Soxhlet apparatus, the sample underwent thermogravimetry again. It was found that about 87% of the elastic polymer remained on the inorganic particles without being extracted.

Referential Example 1

(Preparation of the elastic polymer(B) free of inorganic particles)

This example demonstrates the preparation (polymerization) of the elastic polymer (B) in the absence of the inorganic particulate material (A), unlike Example 1 in which the elastic polymer (B) for the composite particulate material was prepared by polymerization in the presence of the inorganic particulate material (A).

To 900 g of pure water (deionized water) were added 30 g of 10 wt % aqueous solution of the phosphate ester-type nonionic surface active agent (the same one as used in Example 1) and 9 g of 10% aqueous solution of potassium persulfate as a polymerization initiator. The resulting mixture and a monomer mixture were slowly fed into a polymerization reactor over 2 hours, during which the contents were kept at 70° C. and stirred continuously at about 300 rpm. The monomer mixture is composed of 270 g of butyl acrylate and 30 g of maleic anhydride dissolved in the former. After feeding, stirring was continued for about 1 hour at 70° C.

The resulting reaction product was poured into 2000 g of 0.75 wt % aqueous solution of aluminum sulfate which was stirred continuously, so as to bring about coagulation. The coagulum was filtered out and washed repeatedly and finally vacuum-dried at 70° C. for 12 hours. Thus there was obtained the elastic polymer (B-1). The yield of polymerization was about 85%. When heated at 100° C. in 100 g of toluene, 1 g of the elastic polymer (B-1) was dissolved completely.

In addition, the elastic polymer (B-1) was found to have a glass transition temperature of about −50° C. (measured by differential scanning calorimetry).

Referential Example 2

The same procedure as in Referential Example 1 was repeated to prepare the elastic polymer (B-2), except that the monomer mixture was replaced by the one which is composed of 240 g of butyl acrylate and 60 g of maleic anhydride dissolved in the former. The yield of polymerization was about 70%. When heated at 100° C. in 100 g of toluene, 1 g of the elastic polymer (B-2) was dissolved completely.

In addition, the elastic polymer (B-2) was found to have a glass transition temperature of about −40° C. (measured by differential scanning calorimetry).

Referential Example 3

The same procedure as in Referential Example 1 was repeated to prepare the elastic polymer (B-3), except that the monomer mixture was replaced by the one which is composed of 300 g of butyl acrylate alone. The yield of polymerization was about 73%. When heated at 100° C. in 100 g of toluene, 1 g of the elastic polymer (B-3) was dissolved completely.

In addition, the elastic polymer (B-3) was found to have a glass transition temperature of about −54° C. (measured by differential scanning calorimetry).

Comparative Example 1

The same procedure as in Example 1 was repeated to produce the composite particulate material (C-9), except that the monomer mixture composed of butyl acrylate and maleic anhydride was replaced by 60 g of butyl acrylate alone. The resulting composite particulate material was found by thermogravimetry to contain 17.3% of polybutyl acrylate in solids. This content suggests that the degree of conversion for the polymer was about 76%. After extraction with toluene for 10 hours by means of a Soxhlet apparatus, the sample underwent thermogravimetry again. It was found that about 86% of the elastic polymer remained on the inorganic particles without being extracted.

Comparative Example 2

The same procedure as in Example 1 was repeated to produce the composite particulate material (C-10), except that the monomer mixture composed of butyl acrylate and maleic anhydride was replaced by the one which is composed of 54 g of methyl methacrylate and 6 g of maleic anhydride dissolved in the former. The resulting composite particulate material was found by thermogravimetry to contain 18.0% of elastic polymer in solids. This content suggests that the degree of conversion for the elastic copolymer was about 90%. After extraction with toluene for 10 hours by means of a Soxhlet apparatus, the sample underwent thermogravimetry again. It was found that about 81% of the elastic polymer remained on the inorganic particles without being extracted.

Referential Example 4

The same procedure as in Referential Example 1 was repeated, except that the monomer mixture was replaced by the one in which the ratio of methyl methacrylate and maleic anhydride was changed to 9/1. The resulting polymer was found to have a glass transition temperature of 115° C. (measured by differential scanning calorimetry).

Comparative Example 3

The same procedure as in Example 1 was repeated to produce the composite particulate material (C-11), except that the amount of the surface-treated talc (A-1) was changed to 120 g and the monomer mixture was replaced by the one which is composed of 162 g of butyl acrylate and 18 g of maleic anhydride dissolved in the former. The resulting composite particulate material was found by thermogravimetry to contain 55.0% of elastic polymer in solids. This content suggests that the degree of conversion for the elastic polymer was about 92%. After extraction with toluene for 10 hours by means of a Soxhlet apparatus, the sample underwent thermogravimetry again. It was found that about 30% of the elastic polymer remained on the inorganic particles without being extracted.

Comparative Example 4

The same procedure as in Example 3 was repeated to produce the composite particulate material (C-12), except that the amount of the monomer mixture composed of butyl acrylate and maleic anhydride was replaced by 60 g of butyl acrylate alone. The resulting composite particulate material was found by thermogravimetry to contain 17.0% of elastic polymer in solids. This content suggests that the degree of conversion for the elastic polymer was about 82%. After extraction with toluene for 10 hours by means of a Soxhlet apparatus, the sample underwent thermogravimetry again. It was found that about 88% of the elastic polymer remained on the inorganic particles without being extracted.

Comparative Example 5

The same procedure as in Example 5 was repeated to produce the composite particulate material (C-13), except that the amount of the monomer mixture composed of butyl acrylate and maleic anhydride was replaced by 60 g of butyl acrylate alone. The resulting composite particulate material was found by thermogravimetry to contain 16.8% of elastic polymer in solids. This content suggests that the degree of conversion for the elastic polymer was about 81%. After extraction with toluene for 10 hours by means of a Soxhlet apparatus, the sample underwent thermogravimetry again. It was found that about 86% of the elastic polymer remained on the inorganic particles without being extracted.

Example 9
(Reinforcement of a thermoplastic resin with the composite particulate material)

A resin composition was prepared from 18 parts by weight of the composite particulate material (C-1) obtained in Example 1 and 82 parts by weight of nylon-6 ($\eta$ r=2.70) by extrusion through a twin-screw extruder at a cylinder temperature of 250° C. The extrudate was made into pellets (P-1).

After drying, the pellets were injection-molded into rod test pieces (½"×5"×⅛" thick), Izod impact test pieces (⅛" thick), and flat plates (70 mm square and 2 mm thick), with the cylinder temperature being 250° C. and the mold temperature being 80° C.

The rod test piece was found by flexural test to have a flexural modulus of 3.6 GPa. It was also found to have an Izod impact value (with notch) as high as 140 J/m. Furthermore, it was found to have a distortion temperature of 203° C. under a low load of 455 kPa.

The flat plate specimen (2 mm thick) was tested for puncture impact at 23° C. using a high-speed puncture impact testing machine ("Servopulser" EHF-U2H-20L, made by SHIMADZU Corporation), with the punch tip radius being ⅝" and the impact speed being 2.5 m/s. The specimen was found to have an average total puncture energy of 6.0 J and an average maximum deflection of 15 mm.

The flat plate specimen was measured for molding shrinkage in the MD direction (parallel to resin flow) and the TD direction (perpendicular to resin flow). It was found that the molding shrinkage was 0.92% in both the MD and TD directions. This suggests that the specimen was two-dimensionally isotropic.

An extremely thin section was prepared from the resin composition and was observed under a transmission electron microscope (TEM). It was found that only a small portion (less than about 10%) of the elastic polymer (B) is present in the form of independent particles. In other words, a large portion (more than about 90%) of the elastic polymer (B) is in contact with the talc particles.

Comparative Example 6

A resin composition was prepared from 18 parts by weight of the talc (A-1) treated with a coupling agent under the same condition as in Example 1, 3 parts by weight of the butyl acrylate/maleic anhydride copolymer (B-1) obtained in Referential Example 1, and 82 parts by weight of nylon-6($\eta$ r=2.70) by extrusion through a twin screw extruder at a cylinder temperature of 250° C. The extrudate was made into pellets. The composition of the pellets is substantially the same as that of the pellets obtained in Example 9.

An extremely thin section was prepared from the resin composition and was observed under a transmission electron microscope (TEM). It was found that a large portion of the copolymer is present in the form of particles dispersed throughout the nylon-6. In other words, only a small portion (less than 20% in terms of area) of the copolymer is in contact with the talc particles.

After drying, the pellets were injection molded into rod test pieces (½"×5"×⅛" thick), Izod impact test pieces (⅛" thick), and flat plates (70 mm square and 2 mm thick) under the same condition as in Example 9.

The rod test piece was found by flexural test to have a flexural modulus of 4.0 GPa. It was also found to have an Izod impact value (with notch) of 65 J/m, which is lower than that in Example 9. Furthermore, it was found to have a distortion temperature of 198° C. under a low load of 455 kPa.

The flat plate specimen (2 mm thick) underwent high-speed puncture impact test at 23° C. The specimen showed an average total puncture energy of 2.2 J and an average maximum deflection of 7.8 mm. This result suggests that the specimen is more brittle than that in Example 9.

The molding shrinkage was 1.08% in the MD direction and 1.12% in the TD direction, with the TD/MD ratio being 1.04. It is to be noted that the specimen is two-dimensionally almost isotropic but the absolute value of the shrinkage is higher than that in Example 9.

Comparative Example 7

A resin composition was prepared from 15 parts by weight of the talc (A-1) treated with a coupling agent under the same condition as in Example 1 and 85 parts by weight of nylon-6 ($\eta$ r=2.70) by extrusion through a twin-screw extruder at a cylinder temperature of 250° C. The extrudate was made into pellets.

After drying, the pellets were injection molded into rod test pieces (½"×5"×⅛" thick), Izod impact test pieces(⅛" thick), and flat plates (70 mm square and 2 mm thick) under the same condition as in Example 9.

The rod test piece was found by flexural test to have a flexural modulus of 4.0 GPa. It was also found to have an Izod impact value (with notch) of 72 J/m, which is lower than that in Example 9. Furthermore, it was found to have a distortion temperature of 204° C. under a low load of 455 kPa. This result is almost comparable to that in Example 9.

The flat plate specimen (2 mm thick) underwent high-speed puncture impact test at 23° C. The specimen showed an average total puncture energy of 1.3 J and a maximum deflection of 6.5 mm. This result suggests that the specimen is more brittle than that in Example 9.

The molding shrinkage was 0.81% in the MD direction and 0.88% in the TD direction, with the TD/MD ratio being 1.10. It is to be noted that the specimen is two-dimensionally anisotropic although the absolute value of the shrinkage is lower than that in Example 9.

Examples 10 to 18 and Comparative Examples 9 to 21

Various resin compositions were prepared according to the formulation shown in Table 1 from the composite particulate materials (C) prepared in Examples 2–8 and Comparative Examples 1–6, the thermoplastic resin (D), and the inorganic particulate material (A) such as talc, kaolin, silica, and glass fiber. Each of the resin compositions was molded under the same condition as in Example 9, and the molded specimens were tested for physical properties. The results are shown in Table 2.

Example 19

A resin composition was prepared from a premix composed of 18 parts by weight of the composite particulate material (C-1) obtained in Example 1, 82 parts by weight of nylon-6 (η r=2.70), and 10 parts by weight of chopped glass fiber, by extrusion through a twin-screw extruder at a cylinder temperature of 250° C. The extrudate was made into pellets.

After drying, the pellets were injection molded into rod test pieces (½"×5"×⅛" thick), Izod impact test pieces (⅛" thick), and flat plates (70 mm square and 2 mm thick), with the cylinder temperature being 250° C. and the mold temperature being 80° C.

The rod test piece was found by flexural test to have a flexural modulus of 5.8 GPa. It was also found to have an Izod impact value (with notch) as high as 98 J/m. Furthermore, it was found to have a distortion temperature of 211° C. under a low load of 455 kPa.

The flat plate specimen (2 mm thick) was tested for puncture impact at 23° C. using a high-speed puncture impact testing machine ("Servopulser" EHF-U2H-20L, made by SHIMADZU Corporation), with the punch tip radius being ⅝" and the impact speed being 2.5 m/s. The specimen was found to have an average total puncture energy of 2.2 J and an average maximum deflection of 9.3 mm.

The flat plate specimen was measured for molding shrinkage in the MD direction (parallel to resin flow) and the TD direction (perpendicular to resin flow). It was found that the molding shrinkage was 0.61% in the MD direction and 1.10% in the TD directions, with the TD/MD ratio being 1.8. This suggests that the specimen is less anisotropic than that in Comparative Example 13 which contains 15 wt % of glass fiber alone.

Example 20

A resin composition was prepared from a premix composed of 18 parts by weight of the composite particulate material (C-1) obtained in Example 1, 82 parts by weight of nylon-6 (η r=2.70), 0.3 part by weight of maleic anhydride*, and 0.03 part by weight of a radical initiator**, by extrusion through a twin-screw extruder at a cylinder temperature of 250° C. The extrudate was made into pellets.

* The maleic anhydride serves as the compound (E) having in the molecule functional groups capable of forming chemical bonds with the resin.
** The radical initiator is 2,5-dimethyl-2,5-di-(t-butylperoxy)hexane.

The pellets were molded under the same condition as in Example 9, and the molded items were tested for physical properties. The results are shown below.

| | |
|---|---|
| Izod impact strength (with notch), 1/8" thick | 150 J/m |
| Flexural modulus | 3.5 GPa |
| Distortion temperature under load of 455 kPa | 192° C. |
| High-speed puncture impact test (total puncture energy) | 7.2 J |
| High-speed puncture impact test (puncture deflection) | 15.3 mm |
| Molding shrinkage in MD and TD directions | 0.92 and 0.92% |
| Molding shrinkage, TD/MD ratio | 1.00 |

The flat plate specimen (70 mm square, 2 mm thick) was tested for puncture impact at 23° C. using a high-speed puncture impact testing machine ("Servopulser" EHF-U2H-20L, made by SHIMADZU Corporation), with the punch tip radius being ⅝" and the impact speed being 2.5 m/s. The specimen was found to have an average total puncture energy of 6.1 J and an average maximum deflection of 15.3 mm. Of 10 specimens tested, 9 suffered ductile fracture and only 1 suffered brittle fracture.

It has been shown that the resin composition of the present invention gives rise to molded items which have balanced heat resistance, stiffness, and impact strength, as well as small anisotropy.

TABLE 1-1

| Example No. | Composite particulate material (C) | Thermoplastic resin (D) | Inorganic particulate material (A) | Elastic polymer (B) | Composition (D)/(C) | Composition (D)/(A)/(B) | Method of preparing resin composition |
|---|---|---|---|---|---|---|---|
| Example 10 | (C-2) | Nylon-6 (D-1) | — | — | 82/18 | — | Melt-mixing of composite particulate material and thermoplastic resin |
| Example 11 | (C-3) | Nylon-6 (D-1) | — | — | 82/18 | — | Melt-mixing of composite particulate material and thermoplastic resin |
| Example 12 | (C-4) | Nylon-6 (D-1) | — | — | 82/18 | — | Melt-mixing of composite particulate material and thermoplastic resin |
| Example 13 | (C-5) | Nylon-6 (D-1) | — | — | 82/18 | — | Melt-mixing of composite particulate material and thermoplastic resin |
| Example 14 | (C-6) | Nylon-6 (D-1) | — | — | 82/18 | — | Melt-mixing of composite particulate material and thermoplastic resin |
| Example 15 | (C-1) | PBT (D-2) | — | — | 82/18 | — | Melt-mixing of composite particulate material and thermoplastic resin |
| Example 16 | (C-7) | Nylon-6 (D-1) | — | — | 82/18 | — | Melt-mixing of composite particulate material and thermoplastic resin |

TABLE 1-1-continued

| Example No. | Composite particulate material (C) | Thermoplastic resin (D) | Inorganic particulate material (A) | Elastic polymer (B) | Composition (D)/(C) | Composition (D)/(A)/(B) | Method of preparing resin composition |
|---|---|---|---|---|---|---|---|
| Example 17 | (C-8) | Nylon-6 (D-1) | — | — | 82/18 | — | Melt-mixing of composite particulate material and thermoplastic resin |
| Example 18 | (C-1) | Nylon-6 (D-1) | — | — | 70/30 | — | Melt-mixing of composite particulate material and thermoplastic resin |

TABLE 1-2

| Comparative Example No. | Composite particulate material (C) | Thermoplastic resin (D) | Inorganic particulate material (A) | Elastic polymer (B) | Composition (D)/(C) | Composition (D)/(A)/(B) | Method of preparing resin composition |
|---|---|---|---|---|---|---|---|
| 9 | — | Nylon-6 (D-1) | — | — | | | Thermoplastic resin alone |
| 10 | — | PBT (D-2) | — | — | | | " |
| 11 | — | Nylon-6 (D-1) | Talc (A-1) | BA/MAH (B-1) | | 82/15/3 | Mixing of thermoplastic resin, inorganic particulate material and elastic polymer |
| 12 | — | Nylon-6 (D-1) | — | BA/MAH (B-1) | | 97/0/3 | Melt-mixing of thermoplastic resin and elastic polymer |
| 13 | — | Nylon-6 (D-1) | Glass fiber | — | | 85/15/0 | Melt-mixing of thermoplastic resin and glass fiber |
| 14 | — | Nylon-6 (D-1) | Silica (A-2) | BA/MAH (B-1) | | 82/15/3 | Mixing of thermoplastic resin, inorganic particulate material, and elastic polymer |
| 15 | (C-9) | Nylon-6 (D-1) | — | — | 82/18 | — | Melt-mixing of thermoplastic resin and composite particulate material |
| 16 | (C-10) | Nylon-6 (D-1) | — | — | 82/18 | — | Melt-mixing of thermoplastic resin and composite particulate material |
| 17 | (C-11) | Nylon-6 (D-1) | — | — | 82/18 | — | Melt-mixing of thermoplastic resin and composite particulate material |
| 18 | — | Nylon-6 (D-1) | Talc (A-1) | — | | 85/15/0 | Melt-mixing of thermoplastic resin and inorganic particulate material |
| 19 | — | PBT (D-2) | Talc (A-1) | — | | 85/15/0 | Melt-mixing of thermoplastic resin and inorganic particulate material |
| 20 | — | Nylon-6 (D-1) | Talc (A-5) | BA/MAH (B-1) | | 82/15/3 | Mixing of themroplastic resin, inorganic particulate material, and elastic polymer |
| 21 | — | Nylon-6 (D-1) | Kaolin (A-3) | BA/MAH (B-1) | | 82/15/3 | Mixing of themroplastic resin, inorganic particulate material, and elastic polymer |

TABLE 2-1

| Example No. | Notched Izod impact strength (J/m). 1/8" thick | Flexural modulus (GPa) | Distortion temperature under load (°C.) | Hi-speed puncture impact test Puncture energy (J) | Hi-speed puncture impact test Puncture deflection (mm) | Molding shrinkage (%). MD/TD | Molding shrinkage, TD/MD ratio |
|---|---|---|---|---|---|---|---|
| Example 10 | 133 | 3.4 | 203 | 7.2 | 16.3 | 0.95/0.98 | 1.03 |
| Example 11 | 151 | 3.7 | 204 | 6.6 | 15.8 | 0.89/0.89 | 1.00 |
| Example 12 | 90 | 3.2 | 199 | 3.0 | 12.4 | 0.98/1.00 | 1.02 |
| Example 13 | 129 | 3.2 | 191 | 6.3 | 24.0 | 0.88/0.90 | 1.02 |
| Example 14 | 103 | 3.2 | 192 | 5.8 | 15.0 | 1.02/1.06 | 1.04 |
| Example 15 | 93 | 3.3 | 198 | 2.1 | 13.6 | 1.80/1.93 | 1.07 |
| Example 16 | 122 | 3.4 | 193 | 6.4 | 23.0 | 0.88/0.81 | 0.92 |
| Example 17 | 139 | 3.4 | 186 | 6.9 | 28.0 | 0.96/0.97 | 1.01 |
| Example 18 | 98 | 3.8 | 195 | 6.8 | 22.0 | 0.88/0.88 | 1.00 |

TABLE 2-2

| Comparative Example No. | Notched Izod impact strength (J/m). 1/8" thick | Flexural modulus (GPa) | Distortion temperature under load (°C.) | Hi-speed puncture impact test | | Molding shrinkage (%). MD/TD | Molding shrinkage, TD/MD ratio |
|---|---|---|---|---|---|---|---|
| | | | | Puncture energy (J) | Puncture deflection (mm) | | |
| 9  | 50  | 2.8 | 185 | 10.0 | 25.0 | 1.67/1.64 | 0.98 |
| 10 | 36  | 2.5 | 170 | 4.2  | 13.0 | 2.17/2.00 | 0.92 |
| 11 | 68  | 4.1 | 199 | 2.8  | 8.6  | 1.16/1.20 | 1.03 |
| 12 | 72  | 2.5 | 180 | 12.6 | 26.0 | 1.80/1.82 | 1.01 |
| 13 | 66  | 5.2 | 210 | 0.3  | 6.5  | 0.47/1.26 | 2.68 |
| 14 | 34  | 3.3 | 190 | 0.8  | 7.2  | 1.08/1.11 | 1.03 |
| 15 | 78  | 2.9 | 191 | 2.4  | 8.0  | 0.96/0.97 | 1.01 |
| 16 | 63  | 3.6 | 204 | 2.0  | 6.0  | 0.99/0.99 | 1.00 |
| 17 | 126 | 2.2 | 178 | 4.6  | 10.3 | 1.27/1.30 | 1.02 |
| 18 | 72  | 4.0 | 204 | 1.3  | 6.5  | 0.81/0.88 | 1.09 |
| 19 | 65  | 3.9 | 208 | 0.6  | 8.0  | 2.18/2.42 | 1.11 |
| 20 | 100 | 4.0 | 202 | 1.8  | 7.0  | 0.88/0.90 | 1.02 |
| 21 | 68  | 3.4 | 190 | 1.6  | 7.2  | 0.96/0.99 | 1.03 |

What is claimed is:

1. A composite particulate material for resin reinforcement which comprises an inorganic particulate material (A) and an elastic polymer (B) having a glass transition temperature of −10° C. or below and also having functional groups which form chemical bonds with resins to be reinforced, said components (A) and (B) accounting for 50–99 wt % and 50–1 wt %, respectively, of their total amount wherein the composite particulate material is obtained by polymerizing monomer as a raw material of the elastic polymer (B) in the presence of the inorganic particulate material (A).

2. A composite particulate material for resin reinforcement as defined in claim 1, wherein the inorganic particulate material (A) is one which has an average particle diameter of 0.1–10μ.

3. A composite particulate material for resin reinforcement as defined in claim 1, wherein the inorganic particulate material (A) is one which is in the form of plate and/or granule.

4. A composite particulate material for resin reinforcement as defined in claim 1, wherein the inorganic particulate material (A) is one which is treated with a coupling agent.

5. A composite particulate material for resin reinforcement as defined in claim 4, wherein the inorganic particulate material (A) is one which is treated with a silane compound.

6. A composite particulate material for resin reinforcement as defined in claim 1, wherein the elastic polymer (B) is one which reacts with resins to be reinforced.

7. A composite particulate material for resin reinforcement as defined in claim 1, wherein the elastic polymer (B) is one which is composed of a first unit (b1) formed from at least one kind of monomer having in the molecule at least one carbon-carbon double bond and functional groups which form chemical bonds with resins to be reinforced, and a second unit (b2) formed from another monomer which copolymerizes with said unit (b1), said units (b1) and (b2) accounting for 0.1–50 wt % and 99.9–50 wt %, respectively, of the amount of the elastic polymer (B).

8. A composite particulate material for resin reinforcement as defined in claim 7, wherein the unit (b1) of the elastic polymer (B) is one which is formed from at least one kind of monomer having in the molecule at least one carbon-carbon double bond and function groups which form chemical bonds with resins to be reinforced, said chemical bonds being any one kind selected from the group consisting of covalent bond, ionic bond, and hydrogen bond.

9. A composite particulate material for resin reinforcement as defined in claim 7, wherein the unit (b2) of the elastic polymer (B) is one which is formed from at least one kind of monomer selected from the group consisting of ethylene, α-olefins having 3 or more carbon atoms, non-conjugated diene, vinyl acetate, vinyl alcohol, alkyl ester of α, β-unsaturated carboxylic acid, conjugated dine, and aromatic vinyl hydrocarbon.

10. A composite particulate material for resin reinforcement as defined in claim 9, wherein the unit (b2) of the elastic polymer (B) is one which is formed from at least one kind of monomer selected from the group consisting of alkyl esters of acrylic acid and/or methacrylic acid.

11. A composite particulate material for resin reinforcement as defined in claim 9, wherein the elastic polymer (B) is one which contains a unit formed from a monomer having in the molecule a carbon-carbon double bond and a di- or tri-alkoxysilyl group, said unit accounting for 0–20 wt % of the amount of the elastic polymer (B).

12. A composite particulate material for resin reinforcement as defined in claim 1, wherein the inorganic particulate material (A) is one which is bonded to the elastic polymer (B), with an interface between.

13. A composite particulate material for resin reinforcement as defined in claim 12, wherein the elastic polymer (B) is one which is characterized by the fact that more than 60 wt % of its constituent remains on the inorganic particulate material (A) without being extracted when the composite particulate material is extracted using a solvent which exhibits a solubility that is greater than 1 g per 100 g for the isolated constituent of the elastic polymer (B) at a temperature for extraction.

14. A reinforced resin composition which comprises a composite particulate material for resin reinforcement (C) and a thermoplastic resin (D), said composite particulate material (C) which comprises an inorganic particulate material (A) and an elastic polymer (B) having a glass transition temperature of −10° C. or below and also having functional groups which form chemical bonds with resins to be reinforced, said components (A) and (B) accounting for 50–99 wt % and 50–1 wt %, respectively, of their total amount wherein the composite particulate material is obtained by polymerizing a monomer as a raw material of the elastic polymer (B) in the presence of the inorganic particulate material (A).

15. A reinforced resin composition as defined in claim 14, wherein said components (C) and (D) accounting for 1–70 wt % and 99–30 wt %, respectively, of their total amount.

16. A reinforced resin composition as defined in claim 14, wherein the thermoplastic resin (D) is one which has a melting point of 150° C. or more if it has a melting point or which has a glass transition temperature of 100° C. or more if it has no melting point.

17. A reinforced resin composition as defined in claim 14, wherein the thermoplastic resin (D) is one which has a flexural modulus of 1.5 GPa or more at 23° C., measured according to ASTM D790.

18. A reinforced resin composition as defined in claim 14, wherein the thermoplastic resin (D) is at least one kind of resin selected from the group consisting of polyester resin, polyamide resin, and polyarylenesulfide resin.

19. A reinforced resin composition as defined in claim 14, which satisfies both of the following inequalities which represent the relationship between the flexural modulus Mc (in GPa) of the reinforced plastic composition and the flexural modulus M0 (in GPa) of the thermoplastic resin (D), both measured at 23° C. according to ASTM D790, and the notched Izod impact strength Sc (⅛" thick, in J/m) measured at 23° C. according to ASTM D256.

$$Mc>M0 \qquad \text{(Formula 1)}$$

$$Mc<0.07*Sc-1.6 \qquad \text{(Formula 2)}$$

20. A reinforced resin composition as defined in claim 14, which has a puncture impact strength, total puncture energy measured according to ASTM D3763 except for a 2-mm thick specimen, which is higher than that which a reinforced plastic composition would have if it is composed substantially only of the thermoplastic resin (D) and the inorganic particulate material (A), which means that the elastic polymer (B) contained in the composite particulate material for resin reinforcement (C) is replaced by the thermoplastic resin (D) of the same amount.

21. A reinforced resin composition as defined in claim 14, which satisfies the following inequality which represents the relationship between the amount XA (in wt %) of the inorganic particulate material (A) in the resin composition, the notched Izod impact strength Sc (⅛" thick, in J/m) of the plastic composition at 23° C., and the notched Izod impact strength S0 (⅛" thick, in J/m) of the thermoplastic resin (D) measured at 23° C. according to ASTM D256.

$$Sc>1.65*XA+S0 \qquad \text{(Formula 3)}$$

22. A reinforced resin composition as defined in claim 14, which satisfies the following inequality which represents the relationship between the amount XB (in wt %) of the elastic polymer (B) having a glass transition temperature of −10° C. or below contained in the resin composition, the notched Izod impact strength Sc (⅛" thick, in J/m) of the resin composition at 23° C., and the notched Izod impact strength S0 (⅛" thick, in J/m) of the thermoplastic resin (D) measured at 23° C. according to ASTM D256.

$$Sc>0.86*XB+1.3*S0 \qquad \text{(Formula 4)}$$

23. A reinforced resin composition as defined in claim 14, which satisfies the following inequality which represents the relationship between the amount XB (in wt %) of the elastic polymer (B) having a glass transition temperature of −10° C. or below contained in the resin composition, the notched Izod impact strength Sc (⅛" thick, in J/m) of the plastic composition measured at 23° C. according to ASTM D256, and the notched Izod impact strength S0 (⅛" thick, in J/m) of the thermoplastic resin (D) measured at 23° C. according to ASTM D256.

$$Sc>4.5*XB+1.3*S0 \qquad \text{(Formula 5)}$$

24. A reinforced resin composition as defined in claim 14, which further comprises a fibrous reinforcing agent in an amount of 1–70 parts by weight for 100 parts by weight of the resin composition.

25. A reinforced resin composition as defined in claim 14, which is formed by melt-mixing of the composite particulate material for resin reinforcement (C) and the thermoplastic resin (D) along with a compound (E) having functional groups which form chemical bonds with resins to be reinforced.

26. A reinforced resin composition as defined in claim 25, wherein the compound (E) is one which has a carbon-carbon double bond in the molecule.

27. A reinforced resin composition as defined in claim 14, which is formed by melt-mixing the composite particulate material for resin reinforcement (C), the thermoplastic resin (D), and the compound (E) along with a radical initiator (F).

* * * * *

UNITED STATES PATENT AND TRADEMARK OFFICE
CERTIFICATE OF CORRECTION

PATENT NO. : 5,852,108
DATED : Dec. 22, 1998
INVENTOR(S) : Yamanaka et al.

It is certified that error appears in the above-identified patent and that said Letters Patent is hereby corrected as shown below:

Col. 10, approximately at line 36, please change "Sc > 1.86" to - - Sc > 0.86 - -.

Col. 21, Table 1-2, under subtitle "Elastic polymer (B)", please insert - - - - -.

Col. 22, Table 1-2, under subtitle "Composition (D)/(A)/(B)", please change "8211513" to - - 82/15/3 - -.

Signed and Sealed this

Twenty-fifth Day of May, 1999

Attest:

Q. TODD DICKINSON

*Attesting Officer*    Acting Commissioner of Patents and Trademarks